J. C. VAN ANSDALL.
TRACTOR WHEEL.
APPLICATION FILED FEB. 1, 1917.

1,281,232.

Patented Oct. 8, 1918.
2 SHEETS—SHEET 1.

WITNESSES
Chas. C. Kemper
J. S. Schrott

INVENTOR
Joseph C. Van Ansdall.
BY Richard B. Owen
ATTORNEY

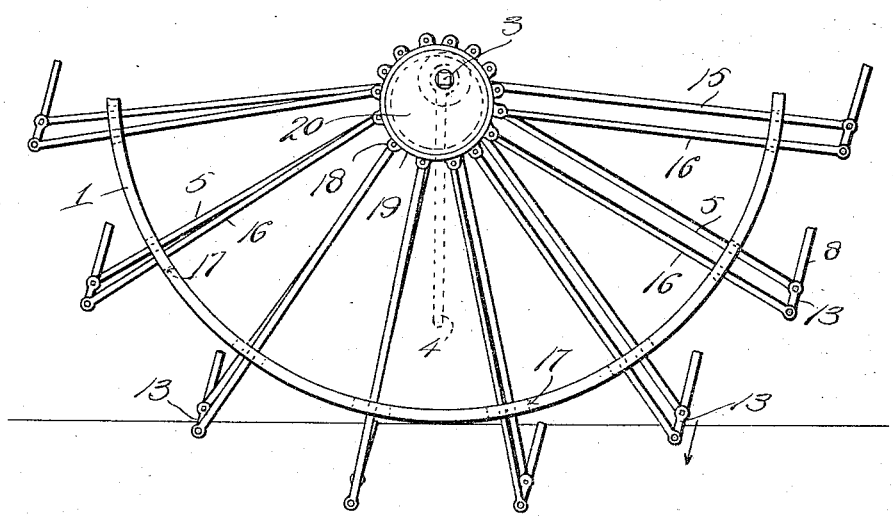
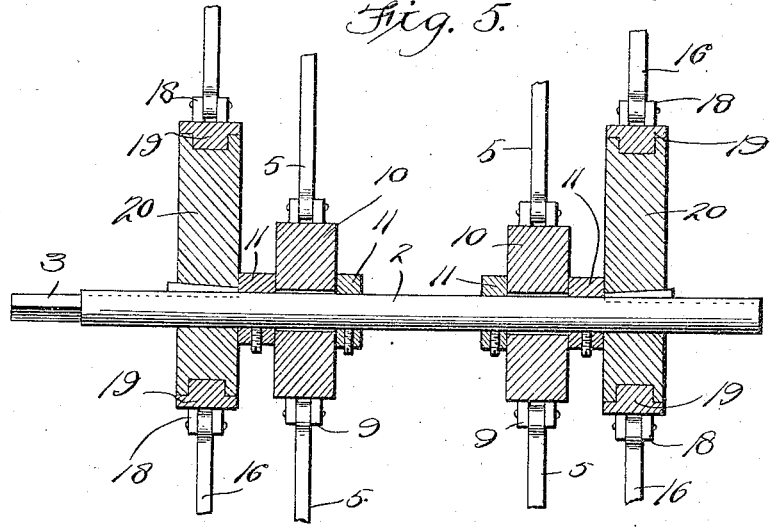

UNITED STATES PATENT OFFICE.

JOSEPH C. VAN ANSDALL, OF KITCHEL, INDIANA.

TRACTOR-WHEEL.

1,281,232.     Specification of Letters Patent.     Patented Oct. 8, 1918.

Application filed February 1, 1917. Serial No. 145,971.

*To all whom it may concern:*

Be it known that I, JOSEPH C. VAN ANSDALL, a citizen of the United States, residing at Kitchel, in the county of Union and State of Indiana, have invented certain new and useful Improvements in Tractor-Wheels, of which the following is a specification.

My invention relates to improvements in tractor wheels, and it consists in the constructions, combinations and arrangements herein described and claimed.

An object of my invention is to provide a wheel for large and heavy tractors which has facilities and means whereby the tractor is enabled to travel over ground surfaces of various characters.

Another object of my invention is to provide a tractor wheel having a plurality of blades or feet which are adapted normally to traverse the circumference of the wheel in parallel planes, but may be shifted to present one edge thereof to the ground to obtain a firm hold thereon as when the tractor is moving over a soft ground surface.

Other objects and advantages will appear from the following specification, reference being had to the accompanying drawings forming a part thereof, in which:

Fig. 4 is a side elevation of the tractor wheel, showing how the feet are shifted when the tractor traverses soft ground and Fig. 5 is an enlarged section of the tractor wheel axle showing more particularly the foot or blade shifting eccentrics.

Figure 1:
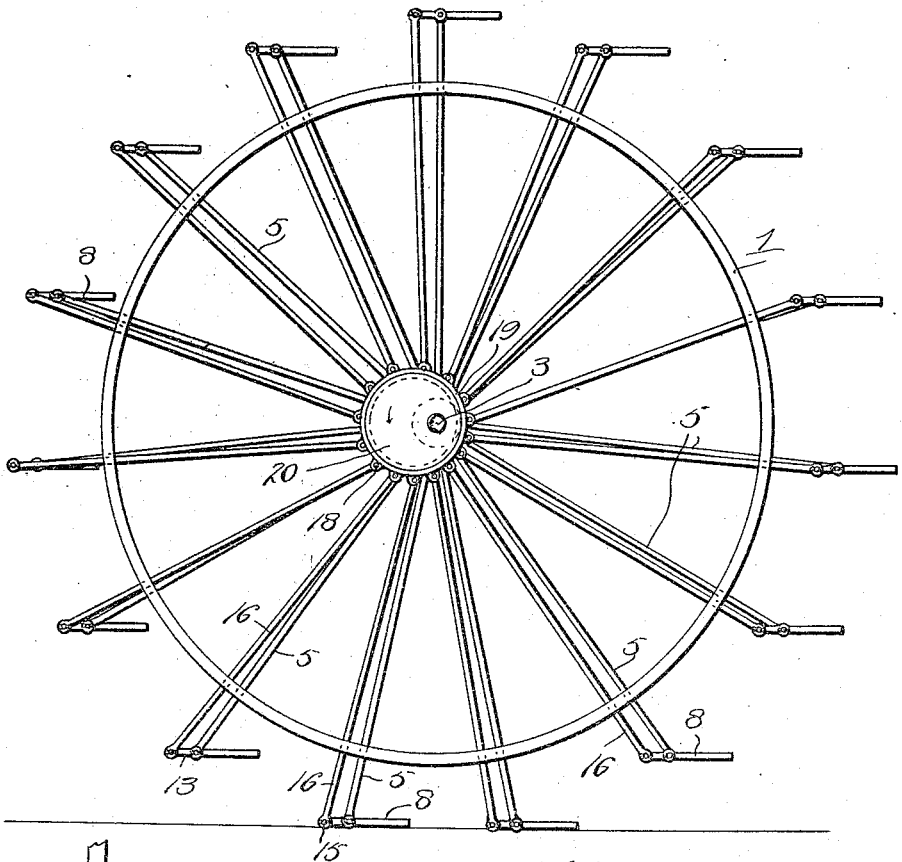
Figure 1 is a side elevation of a tractor wheel embodying my invention.
Figure 2:
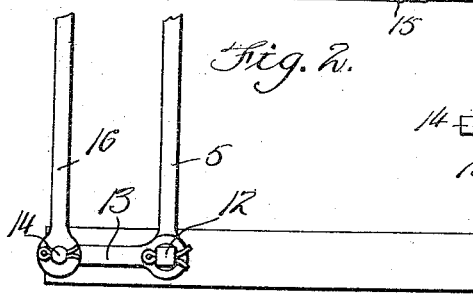
Fig. 2 is an enlarged side elevation of one of the blades or feet.

It is a common experience for those employing tractors of various types, to be compelled to traverse ground having surfaces of different character. It often becomes necessary to move a tractor over soft or marshy ground. When this becomes necessary the weight of the tractor will cause it to sink deeply into the ground where extrication is often impossible. To obviate such difficulties various devices have heretofore been employed, with greater or less degrees of success.

In providing my invention, the tractor wheel embodies such features, that the tractor may be moved over hard ground or soft ground with equal facility. By reference to Fig. 1 it will be seen that the rim 1 of the tractor wheel is disposed concentrically of the axle 2. The axle 2 is supported in suitable bearings on the frame of a tractor, which in the present instance, is not illustrated in the drawings.

The shaft 2 is provided with a square end 3 over which a lever 4, shown in dotted lines in Fig. 4, is adapted to be fitted. By turning the shaft 2 through the medium of the lever 4, certain adjustments are made which will presently be described. The shaft 2 is arranged in such a manner in its bearings on the tractor frame, that it will ordinarily be held from rotation.

The rim 1 of the tractor wheel is supported in its concentric relationship with the axle 1, by a plurality of pairs of spokes 5. The ends of the spokes 5 terminate in enlargements 6 which form bearings for the trunnions 7 of blades 8. The blades or feet 8 are thus fulcrumed on the outer ends of the spokes 5, the oppositely disposed bearing members 6 of the pairs of spokes 5 forming the pivotal supports for each foot or blade 8 as clearly shown in Fig. 1.

The inner ends of the pairs of spokes 5 are fixedly supported in ears 9 of supporting collars 10. By reference to Fig. 5 it will be seen that these supporting collars 10 are loosely and rotatably mounted on the axle 2. These collars 10 are held in position on the axle 2, by suitable abutments 11, these abutments being adjustable so that lateral wear of the collars 10 may readily be taken up. It will thus be readily seen that as the tractor wheel moves, the collars 10 will rotate about the axle 2 the rim 1 and the collars 10 together with the spokes 5, moving as a unit.

Figure 3:
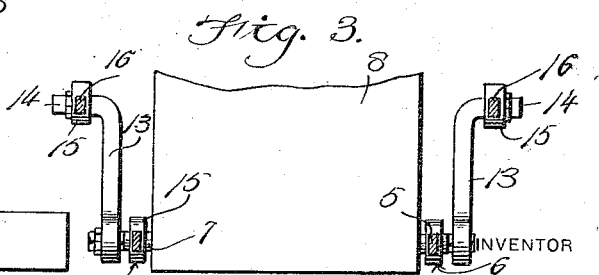
Fig. 3 is a plan view of a portion of the foot shown in Fig. 2, parts thereof being shown in section.

The trunnions 7 of the feet 8 are provided with squared portions 12 adjacent to the connection with the bearings 6 of the spokes 5. These squared portions 12 receive the similarly formed ends of cranks 13, the ends of which are outwardly turned to form bearing pintles 14, as clearly shown in Fig. 3. The pintles 14 pivotally support the outer ends 15 of adjustable spokes 16.

These spokes 16 form companion members to the rigid spokes 5, but in contradistinction with the spokes 5, are adjustable or movable. The spokes 16 are movable relatively to the rim 1, for which purpose the rim 1 is slotted as at 17. The spokes 5 on the other hand, having no relative movement, simply pass through suitable openings in the rim.

The inner ends of the spokes 16 are fulcrumed in bearing ears 18 on the strap 19 of an eccentric. The eccentric strap 19 is formed with an internal annular rib which moves in a similarly formed groove of an eccentric sheave 20. By reference to Fig. 5 it will be observed that each of the sheaves 20 is secured to the axle 2 by a suitable key, at places outside of the collars 10. It will also be evident from the construction shown in Fig. 5, that upon rotation of the axle 2 through the medium of the lever 4, the sheaves 20 will be turned to secure a changed adjustment of the blades or feet 8. When the sheaves 20 are turned in this manner, the spokes 16 will be shifted, and the feet 8 turned on their fulcrums on the trunnions 7.

Having thus described the construction of my device the operation is as follows: The normal position of the blades 8 of the tractor wheel is that as shown in Fig. 1. From Fig. 1 it will be observed that the feet 8 move around with the wheel and maintain their position in a horizontal plane. The horizontal plane of the feet 8 is maintained by the coaction of the movable spokes 16 with the cranks 13 of the blades 8.

In performing its rotational movements, the bearing portions 6 of the spokes 5 will of course move in a constant circle with respect to the axle 2. The spokes 16 however, will have a certain outward, inward and lateral movement which is governed by the connection of the strap 19 with the respective sheave 20. The sheaves 20 are fixed on the axle 2, which as previously stated is normally held from rotation. It will therefore be evident that as the pivotal portions of the feet 8 move in a circle concentric to the axle 2 and that as the inner ends of the spokes 16 move in a circle eccentric to the axle 2, that there will be a relative movement of the spokes 16 which will effect the shifting of the feet 8 in such proportions that when the adjustment of the eccentrics 20 is maintained as shown in Fig. 1, they will always remain horizontal.

This adjustment of the feet 8 is maintained when the tractor traverses hard ground. When a stretch of soft ground is encountered, the lever 4 is employed to rock the axle 2 in its bearings on the tractor frame to secure the adjustment of the sheaves 20 to the position shown in Fig. 4 from that shown in Fig. 1. By reference to Fig. 4 it will readily be apparent that as the various spokes move around, the movable spokes 16 will encounter the lobes of the eccentrics 20 at an earlier time in their downward movement. The outward thrust of the spokes 16 thus occurs at a different time with the result that the feet 8 are moved on their fulcrums 7 and the rear portion of each foot 8 caused to be projected downwardly.

As the machine now traverses soft ground, the downwardly projected portions of the blades 8 will dig into the ground and secure a firm hold thereon, while the rim 1 rides or rests on the general surface thereof.

While the construction of the device as set out in the drawings in the above description is that of a generally preferred form, obviously modifications and changes may be made without departing from the spirit of the invention or the scope of the claims.

I claim:

1. A tractor wheel including a rim and an axle, spokes mounted in the rim having bearing ends projecting therefrom, the spokes having movable connections on the axle, blades fulcrumed in the projecting ends of the spokes and being adapted to maintain a normally horizontal plane, turning means for the blades, movable spokes engageable with the turning means, and shifting means on the axle arranged to receive the ends of the movable spokes and adapted to shift the blades on their fulcrums upon adjustment thereof.

2. A tractor wheel including in combination a normally fixed axle, a rim having spokes with connections rotatable upon the axle, the ends of the spokes projecting beyond the rim, blades fulcrumed on the ends of the spokes, cranks extending from the fulcrums, movable spokes connected to the cranks and passing through slots in the rim, and an eccentric on the axle for supporting the adjacent ends of the movable spokes and adapted to maintain the blades in a horizontal position.

3. A tractor wheel including in combination a normally fixed axle, a rim having spokes with connections rotatably mounted on the axle, the ends of the spokes projecting beyond the rim, blades pivoted on the ends of the spokes, cranks extending from the pivots, movable spokes connected with the cranks, a strap eccentrically disposed on the axle, and a sheave secured to the axle for carrying the strap and causing the blades to maintain a horizontal position, and means for turning the sheave to vary the adjustment of the blades.

4. A tractor wheel including in combination, an axle, a rim, spokes projecting beyond the periphery of said rim, means for connecting the inner ends of said spokes at a uniform distance from said axle, blades pivotally mounted upon the outer end of said spokes, movable spokes connected to said blades, and eccentrically mounted means carried by said shaft and connected to said movable spokes, thus permitting the movable spokes to shift to change the position of said blades.

5. A tractor wheel including in combination, a normally fixed axle, a rim, a collar positioned upon said axle, spokes connected to said collar and extending through said rim, thus causing the inner ends of said spokes to be uniformly spaced from said axle, blades pivotally mounted upon the outer ends of said spokes, an eccentric mounted upon said axle, means for shifting said eccentric, and movable spokes connected to said eccentric and to said blades for shifting said blades when said eccentric is shifted.

6. A tractor wheel including in combination, a normally fixed axle, a rim, a collar carried upon said axle, spokes connected to said collar and projecting through said rim, thus causing the inner ends of said spokes to be uniformly spaced from said axle, blades pivoted on the outer ends of said spokes, cranks extending from the pivots of said blades, movable spokes connected to said cranks, an eccentric mounted upon said axle, means for shifting said eccentric, and the inner ends of said movable spokes being connected to said eccentric, thus causing said blades to be shifted as said eccentric is shifted.

In testimony whereof I affix my signature in presence of two witnesses.

JOSEPH C. VAN ANSDALL.

Witnesses:
J. S. ZOYALL,
N. R. CHANNELLS.

Copies of this patent may be obtained for five cents each, by addressing the "Commissioner of Patents, Washington, D. C."